(12) United States Patent
Walker et al.

(10) Patent No.: US 11,394,636 B1
(45) Date of Patent: Jul. 19, 2022

(54) NETWORK CONNECTION PATH OBFUSCATION USING GLOBAL ACCESS POINTS

(71) Applicant: Amazon Technologies, Inc., Seattle, WA (US)

(72) Inventors: David Walker, Basingstoke (GB); Andrew Langhorn, Manchester (GB)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 41 days.

(21) Appl. No.: 17/118,415

(22) Filed: Dec. 10, 2020

(51) Int. Cl.
*H04L 45/24* (2022.01)
*H04L 45/00* (2022.01)
*H04L 47/125* (2022.01)
*H04L 67/10* (2022.01)

(52) U.S. Cl.
CPC .............. *H04L 45/24* (2013.01); *H04L 45/20* (2013.01); *H04L 47/125* (2013.01); *H04L 67/10* (2013.01)

(58) Field of Classification Search
CPC ......... H04L 45/20; H04L 45/24; H04L 47/10; H04L 47/12; H04L 47/122; H04L 47/125; H04L 47/17; H04L 47/18; H04L 67/10; H04L 67/1004; H04L 67/101; H04L 67/1031; H04L 67/1038
See application file for complete search history.

(56) References Cited

U.S. PATENT DOCUMENTS

| | | | | |
|---|---|---|---|---|
| 6,108,727 A * | 8/2000 | Boals | ...................... | H04L 67/38 710/68 |
| 6,330,231 B1 * | 12/2001 | Bi | .......................... | H04L 67/04 370/328 |
| 6,353,599 B1 * | 3/2002 | Bi | .......................... | H04L 67/04 370/328 |
| 6,427,174 B1 | 7/2002 | Sitaraman et al. | | |
| 8,078,755 B1 | 12/2011 | Liu et al. | | |
| 8,498,295 B1 | 7/2013 | Saxena et al. | | |
| 8,606,922 B1 | 12/2013 | Greenfield et al. | | |
| 9,407,539 B1 | 8/2016 | Dickinson et al. | | |

(Continued)

FOREIGN PATENT DOCUMENTS

| | | | | | |
|---|---|---|---|---|---|
| CN | 107409092 A | * | 11/2017 | ............. | H04L 45/12 |
| GB | 2320159 A | * | 6/1998 | ......... | H04L 12/4608 |

(Continued)

OTHER PUBLICATIONS

Anonymous, Sample Configuration for BGP with Two Different Service Providers (Multihoming), Aug. 17, 2005, URL:http://www.cisco.com/c/en/us/support/docs/ip/border-gateway-protocol-bgp/23675-27.html.

(Continued)

*Primary Examiner* — Kevin D Mew
(74) *Attorney, Agent, or Firm* — Knobbe Martens Olson & Bear, LLP

(57) ABSTRACT

Systems and methods are described to provide mechanisms for establishing a private anonymity network that allows network packets to be forwarded via an obfuscated network signal path that is highly configurable. The techniques described herein may allow users to establish a private obfuscated network signal path that utilizes a number of access points, load balancers, and packet forwarders that can collectively provide path randomization and node ephemerality in a manner that may not be feasible or available in public anonymity networks.

20 Claims, 8 Drawing Sheets

(56) References Cited

U.S. PATENT DOCUMENTS

| | | |
|---|---|---|
| 9,935,857 B1 | 4/2018 | Liu et al. |
| 10,091,098 B1 | 10/2018 | Lorenz et al. |
| 10,826,832 B2 | 11/2020 | Radlein et al. |
| 10,848,427 B2 | 11/2020 | Radlein et al. |
| 10,855,580 B2 | 12/2020 | Rashad et al. |
| 10,880,218 B2 | 12/2020 | Radlein et al. |
| 10,972,554 B1 | 4/2021 | Goel et al. |
| 2002/0040402 A1 | 4/2002 | Levy-Abegnoli et al. |
| 2003/0182410 A1 | 9/2003 | Balan et al. |
| 2004/0181522 A1 | 9/2004 | Jardin et al. |
| 2006/0064478 A1 | 3/2006 | Sirkin |
| 2007/0243821 A1 | 10/2007 | Hundscheidt et al. |
| 2011/0099259 A1 | 4/2011 | Lyon |
| 2011/0134769 A1 | 6/2011 | Lee et al. |
| 2011/0153941 A1 | 6/2011 | Spatscheck et al. |
| 2011/0162060 A1 | 6/2011 | Vijayakumar et al. |
| 2011/0235595 A1 | 9/2011 | Mehta et al. |
| 2011/0296051 A1* | 12/2011 | Vange .................. H04L 41/12 709/238 |
| 2012/0250682 A1 | 10/2012 | Vincent |
| 2013/0136139 A1 | 5/2013 | Zheng et al. |
| 2014/0029447 A1* | 1/2014 | Schrum, Jr. ............ H04L 45/54 370/252 |
| 2014/0310418 A1 | 10/2014 | Sorenson et al. |
| 2014/0369348 A1 | 12/2014 | Zhang et al. |
| 2015/0222528 A1 | 8/2015 | Lotfi et al. |
| 2015/0281065 A1 | 10/2015 | Liljenstolpe |
| 2015/0341431 A1 | 11/2015 | Hartrick et al. |
| 2016/0105471 A1* | 4/2016 | Nunes ................. H04L 41/042 709/228 |
| 2016/0191380 A1* | 6/2016 | De ....................... H04W 40/02 370/338 |
| 2016/0255146 A1 | 9/2016 | Stolorz et al. |
| 2016/0262083 A1 | 9/2016 | Chan |
| 2016/0366220 A1 | 12/2016 | Gottlieb et al. |
| 2016/0381559 A1 | 12/2016 | Marin et al. |
| 2017/0013031 A1 | 1/2017 | Kweon et al. |
| 2017/0013508 A1 | 1/2017 | Pallas |
| 2017/0031725 A1 | 2/2017 | Rajagopalan et al. |
| 2017/0230287 A1 | 8/2017 | Hall et al. |
| 2018/0097734 A1 | 4/2018 | Boutros et al. |
| 2018/0285404 A1 | 10/2018 | Turanyi et al. |
| 2019/0013228 A1 | 1/2019 | Takata et al. |
| 2019/0052659 A1 | 2/2019 | Weingarten et al. |
| 2019/0075017 A1 | 3/2019 | Laden et al. |
| 2019/0109899 A1 | 4/2019 | Newton |
| 2019/0281011 A1 | 9/2019 | Pang et al. |
| 2019/0312775 A1 | 10/2019 | Patil et al. |
| 2020/0092181 A1 | 3/2020 | Thiagarajan et al. |
| 2020/0162322 A1 | 5/2020 | Radlein et al. |
| 2020/0314004 A1* | 10/2020 | Rashad ................. H04L 45/42 |
| 2021/0099386 A1 | 4/2021 | Goel et al. |
| 2021/0099387 A1 | 4/2021 | Goel |
| 2021/0099396 A1 | 4/2021 | Goel |

FOREIGN PATENT DOCUMENTS

| | | |
|---|---|---|
| WO | WO 2020/106763 | 5/2020 |
| WO | WO2020/198218 A1 | 10/2020 |
| WO | WO2021/062116 A1 | 4/2021 |

OTHER PUBLICATIONS

Ballani et al., Towards A Global IP Anycast Service, Aug. 22-26, 2005, Philadelphia, PA, SIGCOMM'05, ACM.

International Search Report and Written Opinion in PCT/US2020/052667 dated Nov. 16, 2020.

International Search Report and Written Opinion in PCT/US2019/062277 dated Feb. 6, 2020.

Newswire.Com, Securly Launches Industry First Anycast DNS Powered Entirely by Amazon AWS, Mar. 31, 2017, 3 pages.

Securly.Com, The First Anycast DNS, Powered Entirely by Amazon AWS, Apr. 24, 2017, blog.securly.com, 3 pages.

Srisuresh et al., Load Sharing Using IP Network Address Translation (LSNAT), The Internet Society, Aug. 1998, 18 pages.

Zen, A Case Study in Global Fault Isolation, May 21, 2014, AWS Architecture Blog, 8 pages.

International Search Report and Written Opinion in PCT/US2020/024445 dated Jun. 29, 2020.

* cited by examiner

NETWORK CONNECTION PATH OBFUSCATION USING GLOBAL ACCESS POINTS

BACKGROUND

Generally described, computing devices utilize a communication network, or a series of communication networks, to exchange data. Such data is typically exchanged in network packets via a series of addressable nodes between the source device sending the network packets and the destination device receiving the network packets. The addresses of the source device and the destination device are typically viewable by the nodes in the network path as the network packets traverse the network path. Different techniques for providing anonymity and/or confidentiality can be used to protect the parties exchanging the network packets and the network packets exchanged therebetween.

DETAILED DESCRIPTION

Introduction

Figure 1:
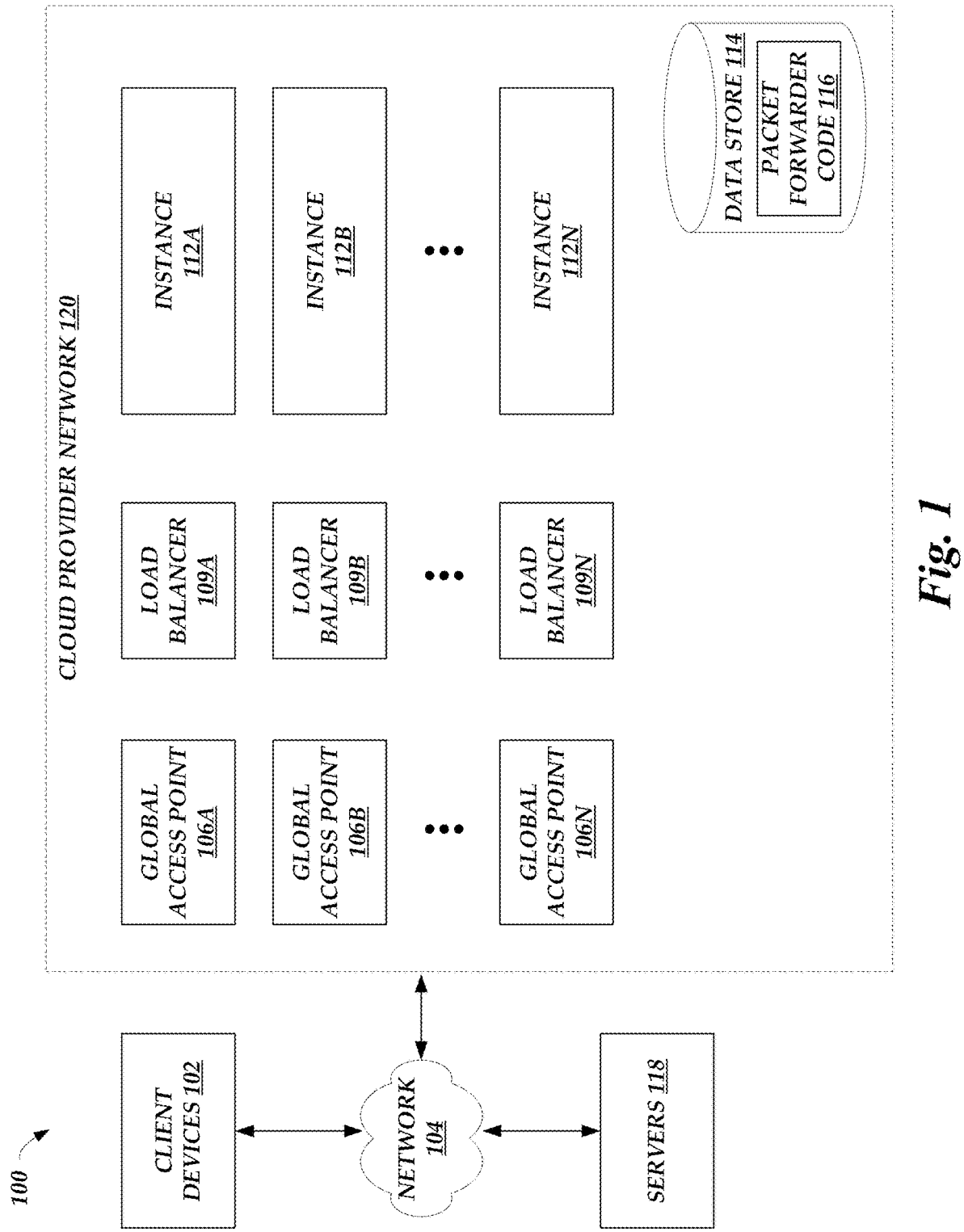
FIG. 1 depicts a diagram of a network environment in which a cloud provider network can implement a network signal path obfuscation service, in accordance with aspects of the present disclosure.

Generally described, computing devices utilize a communication network, or a series of communication networks, to exchange data. Such data is typically exchanged in network packets via a series of addressable nodes between the source device sending the network packets and the destination device receiving the network packets. The addresses of the source device and the destination device are typically viewable by the nodes in the network path as the network packets traverse the network path. Different techniques for providing anonymity and/or confidentiality can be used to protect the parties exchanging the network packets and the network packets exchanged therebetween.

In some implementations, an anonymity network browser may direct network traffic through a public overlay network consisting of thousands of relays via a multi-hop signal path to conceal a user's identity (e.g., identity of the source device). For example, when a network packet is traversing through a series of relays in the public overlay network, a given relay in the network signal path may only know the identity of the previous hop and the next hop. Such an anonymity network browser renders tracing the user's network activity back to the user more difficult. However, because malicious actors sometimes utilize the anonymity network browser to conceal their identity when committing criminal acts, and the nodes in the public overlay network are known, a network packet exiting from a node in such a public overlay network can be associated with the anonymity network browser and may thus be considered suspicious by some organizations. Additionally, such a public overlay network essentially exists in one form and is not easily modifiable by its users.

The aforementioned challenges, among others, are addressed in some embodiments by the disclosed techniques for providing network signal path obfuscation via access points, load balancers, and compute capacity executing packet forwarder code, as described herein. By doing so, the users can easily set up or dismantle their own private anonymity networks, which may resolve the challenges described above (e.g., having their network packets tagged as "suspicious") while still providing the anonymity and confidentiality desired by certain users (e.g., defense and intelligence organizations).

As will be appreciated by one of skill in the art in light of the present disclosure, the embodiments disclosed herein improve the ability of computing systems, such as network communication systems, to provide mechanisms for establishing a private anonymity network that allows network packets to be forwarded via an obfuscated network signal path that is highly configurable. By allowing the users to establish their own private obfuscated network signal paths for forwarding network traffic, the cloud provider network of the present disclosure can address the deficiencies described above.

The presently disclosed embodiments therefore address technical problems inherent within network communication systems and computing systems, such as the inflexibility of a public overlay network used for network signal path obfuscation. These technical problems are addressed by the various technical solutions described herein, including allowing users to establish a private obfuscated network signal path that utilizes a number of access points, load balancers, and packet forwarders that can collectively provide path randomization and node ephemerality in a manner that may not be feasible or available in public anonymity networks. Thus, the present disclosure represents an improvement on existing network communication systems, and computing systems in general.

The foregoing aspects and many of the attendant advantages of this disclosure will become more readily appreciated as the same become better understood by reference to the following description, when taken in conjunction with the accompanying drawings.

Overview of Example Computing Environment for Network Signal Path Obfuscation Service FIG. 1 depicts a diagram of a network environment 100 in which a cloud provider network 120 can implement a network signal path obfuscation service, in accordance with aspects of the present disclosure. A cloud provider network (sometimes referred to as a cloud provider system or simply a "cloud") refers to a large pool of network-accessible computing resources (such as compute, storage, and networking resources, applications, and services), which may be virtualized (e.g., virtual machines) or bare-metal (e.g., bare-metal instances or physical machines). The cloud can provide convenient, on-demand network access to a shared pool of configurable computing resources that can be programmatically provisioned and released in response to customer commands. These resources can be dynamically provisioned and reconfigured to adjust to variable load, which provides the "elasticity" of the cloud provider network 120. Cloud computing can thus be considered as both the applications delivered as services over a publicly accessible network (e.g., the Internet, a cellular communication network) and/or the hardware and software in cloud provider data centers that provide those services. It will be appreciated that the disclosed techniques for providing network signal path obfuscation may be implemented in non-elastic computing environments as well.

The network environment 100 includes client devices 102 and servers 118, each of which can communicate with a cloud provider network 120 and its components via a network 104. The cloud provider network 120 includes a set of global access points 106A-N, a set of load balancers 109A-N, a set of instances 112A-N, and a data store 114. While the global access points 106, load balancers 109, and instances 112 are shown together within the cloud provider network 120, the global access points 106, load balancers 109, and instances 112 may be geographically distant, and independently owned or operated.

As illustrated in FIG. 1, the cloud provider network 120 can communicate over the network 104 with the client devices 102. The network 104 can include any appropriate network, including an intranet, the Internet, a cellular network, a local area network, a global area network, a public network, a private network, or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. The client devices 102 can include any network-equipped computing device, for example, desktop computers, laptops, smartphones, tablets, e-readers, gaming consoles, and the like. The client devices 102 can also include or can be integrated into industrial equipment, farm machinery, home appliances, manufacturing devices, industrial printers, automobiles, thermostats, sensor devices, smart traffic lights, vehicles, buildings, and the like. Users can access the cloud provider network 120 via the network 104 to view or manage their data and computing resources, as well as to use websites and/or applications hosted by the cloud provider network 120. The servers 118 can include any network-equipped computing device, for example, web servers, application servers, file servers, database servers, media servers, game servers, proxy servers, and the like. In some embodiments, some or all of the servers 118 are external to the cloud provider network 120. In other embodiments, some or all of the servers 118 are within the cloud provider network 120.

The cloud provider network 120 may implement various computing resources or services, which may include a virtual compute service (referred to in various implementations as an elastic compute service, a virtual machines service, a computing cloud service, a compute engine, or a cloud compute service), a container orchestration and management service (referred to in various implementations as a container service, cloud container service, container engine, or container cloud service), a Kubernetes-based container orchestration and management service (referred to in various implementations as a container service for Kubernetes, Azure Kubernetes service, IBM cloud Kubernetes service, Kubernetes engine, or container engine for Kubernetes), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account (or across multiple accounts) associated with the cloud provider network 120, in contrast to resources requested by users of the cloud provider network 120, which may be provisioned in one or more user accounts.

The cloud provider network 120 can be formed as a number of regions, where a region is a separate geographical area in which the cloud provider clusters data centers. Each region can include two or more availability zones connected to one another via a private high-speed network, for example, a fiber communication connection. An availability zone refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions and/or availability zones by way of edge locations and regional edge cache servers. This compartmentalization and geographic distribution of computing hardware enables the cloud provider network to provide low latency resource access to customers on a global scale with a high degree of fault tolerance and stability.

Some or all of the components illustrated in FIG. 1 may be implemented in separate availability zones, separate regions, separate networks, separate edge cache nodes or points of presence, and/or separate user accounts. For example, the global access points 106 may each be implemented in a different region and/or a different user account. In some cases, access to the global access points 106 may be provided by one or more user accounts, but the global access points 106 may be implemented, operated, and/or maintained by other components of the cloud provider network 120 outside those user accounts. As another example, the global access point 106A may be implemented in a different region and/or a different user account than the load balancer 109A and the instance 112A, which are both implemented in the same region and the same user account. Different user accounts may be associated with different sets of user credentials, and different regions may be associated with different regional endpoint addresses.

The global access point 106 may route a network packet addressed to a network address associated with the global access point 106 to an appropriate destination. The client device 102 may send a network packet to the global access point 106 for transmission via an obfuscated network signal path. As used herein, the phrase "obfuscated network signal path" refers to a path via which a network packet can be forwarded in such a manner that the individual forwarder nodes are not aware of the origin address and/or the destination address of the network packet as they forward the network packet along the path. For example, a given node in the obfuscated network signal path may access only the network address of the previous hop and the network address of the next hop. The obfuscated network signal path may include various components such as the global access points, load balancers, and instances, as described in greater detail below with reference to FIGS. 3 and 4.

For example, the global access point 106 may forward the network packet to an appropriate load balancer 109 configured to forward the network packet further along the obfuscated network signal path (e.g., based on the load information associated with one or more load balancers 109 in the cloud provider network 102). As another example, the global access point 106 may forward a received network packet to another destination in the connection path associated with the network packet (e.g., in the event of a response packet being sent back to the client device 102).

The global access point 106 may provide a set of application programming interfaces ("APIs") and/or user interfaces that can be used by the users of the client devices 102 to communicate with network resources (e.g., servers 118) via an obfuscated network signal path provided by the cloud provider 120. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network 120 to exchange data with one another. The global access point 106 may also perform load balancing (e.g., to distribute incoming network packets across multiple load balancers 109) and health checking (e.g., to ensure that the load balancers 109 are up and running smoothly).

The load balancer 109 may be hosted on or across one or more physical machines and may distribute the incoming traffic across multiple targets, such as the instances 112, IP addresses, endpoints, and the like, in one or more availability zones or at points of presence not in an availability zone. The load balancer 109 may monitor the health of its registered targets, and route traffic only to the healthy targets. The load balancer 109 may forward one or more network packets received from a global access point 106 to an instance 112 executing a copy of the packet forwarder code 116. The load balancer 109 may also forward one or more network packets received from an instance 112 to a global access point 106 in the connection path associated with such network packets. In some embodiments, the load balancer 109 is implemented on a physical machine comprising computer hardware and storing load balancer code that, when executed, configures the physical machine to perform the load balancing operations described herein.

The instance 112 may provide the compute capacity usable to execute a packet forwarder (e.g., packet forwarder code 116) that can be used to forward a received network packet along an obfuscated network signal path and eventually to the intended destination (e.g., server 118). The instance 112 may include one or more of physical machines, virtual machines, bare-metal instances, containers, nodes, offload cards, or other forms of virtual or physical compute units that are configured to execute the packet forwarder code 116, or any combination thereof.

The network signal path obfuscation service may utilize other services provided within the cloud provider network 120 such as an instance provisioning service and an on-demand (or "serverless") code execution service (not illustrated in FIG. 1). For example, the load balancer 109 may request the instance provisioning service to provide resizable computing capacity (e.g., instance 112) that can be used to execute the packet forwarder code 116. The instance provisioning service may maintain a pool of warmed instances, and in response to receiving the request from the load balancer 109, select an instance from the pool of warmed instances for use by the load balancer 109. As used herein, provisioning an instance generally includes reserving resources (e.g., computational and memory resources) of an underlying physical machine for the client (e.g., from a pool of available physical machines and other resources), installing or launching required software (e.g., an operating system), and making the instance available for performing specific tasks.

As another example, the load balancer 109 may request the on-demand code execution service to execute a copy of the packet forwarder code 116. In response, the on-demand code execution service may acquire a compute instance (e.g., instance 112), which may or may not be visible to the user utilizing the obfuscated network signal path and sending the network packet through the obfuscated network signal path, and cause the copy of the packet forwarder code 116 to be executed on the compute instance. In this example, the instance 112 and/or the copy of the packet forwarder code 116 running on the instance 112 may be associated with a timeout period (e.g., time period after which the instance or execution is automatically terminated), or a timeout period that is much shorter (e.g., 15 minutes) than that in the context of the instance provisioning service in the example described above. Further details regarding such an on-demand or serverless code execution environment can be found within U.S. Pat. No. 9,323,556, entitled "PROGRAMMATIC EVENT DETECTION AND MESSAGE GENERATION FOR REQUESTS TO EXECUTE PROGRAM CODE" and filed Sep. 30, 2014 ("the '556 Patent"), the entirety of which is hereby incorporated by reference. In brief, to execute program codes such as the packet forwarder code on a per-request basis, an on-demand code execution environment may maintain a pool of pre-initialized virtual machine instances that are ready for use as soon as a code execution request is received. When the on-demand code execution environment receives a request to execute the packet forwarder code, which specifies one or more computing constraints for executing the packet forwarder code, the on-demand code execution environment may select a virtual machine instance for executing the packet forwarder code based on the one or more computing constraints specified by the request and cause the packet forwarder code to be executed on the selected virtual machine instance. These packet forwarder codes can be executed in isolated containers that are created on the virtual machine instances. The code execution request, container, and/or virtual machine may be associated with a timeout period (e.g., 15 minutes) after which the container and/or the virtual machine executing the packet forwarder code is shut down. Various embodiments for executing user code on virtual machine instances is described in more detail in the '556 Patent.

The instance 112 can have various configurations of processing power, memory, storage, and networking capacity depending upon the need of the network signal path obfuscation service. The instance may also include computer storage for temporary data used while the instance is running; however, as soon as the instance is shut down this data may be lost.

In some embodiments, some or all of the global access points 106, load balancers 109, and instances 112 may collectively be referred to as a "network signal path obfuscation service." For example, a task described herein as being performed by the network signal path obfuscation service may be performed by one or more of the components shown in FIG. 1 in a distributed manner. In some embodiments, an obfuscated network signal path includes an integer number of sets of a global access point 106, a load balancer, and an instance 112. For example, one obfuscated network signal path may include three global access points 106, three load balancers, and three instances 112, and another obfuscated network signal path may include five global access points 106, five load balancers, and five instances 112.

The data store 114 may store data that is used in connection with providing network signal path obfuscation according to aspects of the present disclosure. As shown in FIG. 1, the data store 114 may store the packet forwarder code 116 that can be downloaded onto any of the instances 112. The packet forwarder code 116 may have been written by a developer and uploaded onto the data store 114 by the user or organization associated with the source client device 102 (or the destination server 118, in the case that the entity providing the destination server 118 wanted control over the obfuscated network signal path). An example of the forwarding tool that may be used to implement the packet forwarder code 116 includes "socat," a multipurpose relay for Linux.

As another example, the data store 114 may store one or more variables or parameter values used in connection with providing network signal path obfuscation such as a maximum hop count. As yet another example, the data store 114 may store a shared key or a shared secret that can be used to encrypt/decrypt and/or authenticate packets forwarded through the obfuscated network signal path.

The network signal path obfuscation service may utilize other services provided within the cloud provider network 120 such as an object storage service (or a hosted version-controlled code storage service) to provide the data store 114. Such an object storage service and associated control plane functionality can provide an object-based storage service (also referred to as blob storage service, cloud object storage service, or cloud storage service, in various implementations). Within the object storage service, data may be stored as objects within resources referred to as buckets. Each object typically includes the data being stored, a variable amount of metadata that enables various capabilities for the object storage service with respect to analyzing a stored object, and a globally unique identifier or key that can be used to retrieve the object. Objects stored on the object storage service are associated with a unique identifier, such that authorized access to them can be obtained through requests from networked computing devices in any location. Each bucket may be associated with a given user account. Users (or other components of the cloud provider network 120) can store as many objects as desired within their buckets, can write, read, and delete objects in their buckets, and can control access to their buckets and the objects contained therein. For example, the instances 112 may access the buckets to write, read, or delete the objects contained therein. Further, in embodiments having a number of different object storage service distributed across different ones of the regions described above, users can choose the region (or regions) where a bucket is stored, for example, to optimize for latency.

Some implementations of the cloud provider network 120 can additionally include block store servers, domain name services ("DNS") servers, relational database servers, and other server configurations (not illustrated) for supporting on-demand cloud computing platforms. Each server may include hardware computer memory and/or processors, an operating system that provides executable program instructions for the general administration and operation of that server, and a computer-readable medium storing instructions that, when executed by a processor of the server, allow the server to perform its intended functions.

Example Arrangement of Client Devices, Access Points, and Data Centers

Figure 2:
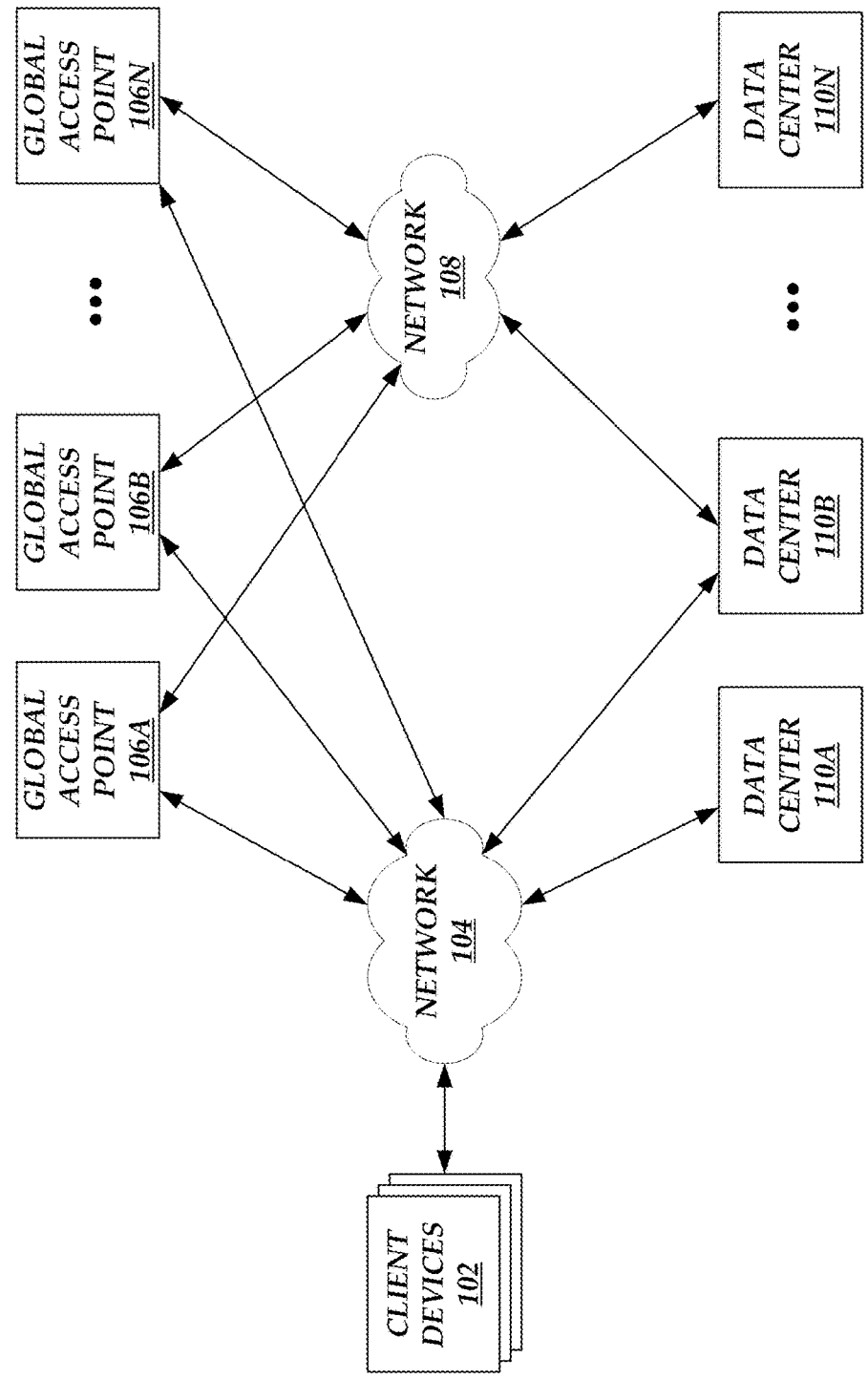
FIG. 2 depicts an illustrative logical network including multiple client devices and data centers, as well as a set of global access points via which the client devices can access the data centers, in accordance with aspects of the present disclosure.

FIG. 2 is a block diagram depicting an illustrative logical environment 200 including the client devices 102 in communication with a set of global access points 106A-N and a set of data centers 110A-N via a first network 104 and/or a second network 108. For example, the client devices 102 could represent a multitude of users in various global, continental, or regional locations accessing network-accessible services provided by the data centers 110, which may further be distributed among various global, continental, or regional locations. The global access points 106 may similarly be distributed. In one embodiment, the data centers 110 represent devices in locations under control of a single entity, such as the cloud provider network 120 of FIG. 1, while the global access points 106 represent devices in co-tenanted locations, such as network "points of presence" or Internet Exchange Points (IXPs). The global access points 106 may generally be more numerous than the data centers 110 and in distinct physical locations. However, in other embodiments, one or more of the access points 106 may be located within one or more data centers 110. Accordingly, the grouping of client devices 102, access points 106, and data centers 110 within FIG. 2 is intended to represent a logical, rather than physical, grouping.

The networks 104 and 108 may be any wired networks, wireless networks or combination thereof. In addition, the networks 104 and 108 may be a personal area network, local area network, wide area network, cable network, satellite network, cellular telephone network, or combination thereof. In the example environment of FIG. 2, the network 104 is a global area network (GAN), such as the Internet, while the network 108 is a private network dedicated to traffic associated with an entity providing the data centers 110 and access points 106 (e.g., cloud provider network 120). Protocols and components for communicating via the other aforementioned types of communication networks are well known to those skilled in the art of computer communications and thus, need not be described in more detail herein.

While each of the client devices 102 and access points 106 are depicted as having a single connection to the network 104, individual components of the client devices 102 and access points 106 may be connected to the network 104 at disparate points (e.g., through different neighboring networks within the network 104). In some embodiments, the data centers 110 may additionally or alternatively be connected to the network 104. For example, as shown in FIG. 2, data center 110A is connected to the network 104 but not to network 108, data center 110B is connected to both the network 104 and the network 108, and data center 110N is connected to the network 108 but not to network 104. For example, data center 110N may be hosting private resources of the cloud provider network 120 (or a customer of the cloud provider network 120) that is not accessible via the network 104 but accessible via the network 108. Similarly, while each of the access points 106 and data centers 110 are depicted as having a single connection to the network 108, individual components of the access points 106 and data centers 110 may be connected to the network 108 at disparate points. Accordingly, communication times and capabilities may vary between the components of FIG. 2. The network configuration of FIG. 2 is intended to be illustrative of a communication path in embodiments of the present disclosure, and not necessarily to depict all possible communications paths. Although not shown in FIG. 2, the environment 200 may include additional networks (e.g., a network owned and operated by a customer of the cloud provider network 120). One or more of such networks may be overlayed on one or both of the networks 104 and 108.

The client devices 102 may include any number of different computing devices capable of communicating with the global access points 106 and/or the data centers 110. For example, individual client devices 102 may correspond to a laptop or tablet computer, personal computer, wearable computer, server, personal digital assistant (PDA), hybrid PDA/mobile phone, mobile phone, electronic book reader, set-top box, camera, digital media player, and the like. In some instances, client devices 102 are operated by end users. In other instance, client devices 102 themselves provide network-accessible services (e.g., servers 118 of FIG. 1), which interact with the global access points 106 and/or the data centers 110 to access other network-accessible services and/or to communicate with other client devices 102.

The data centers 110 of FIG. 2 illustratively include endpoint computing devices providing one or more network-accessible services on behalf of one or more service providers. Illustratively, the data centers 110 may be operated by a "cloud computing" provider such as the cloud provider network 120 of FIG. 1, which makes host computing devices within the data center available to service providers for providing their services. The cloud computing provider may generally manage operation of the data center, while providing various mechanisms for the server providers to configure their respective endpoints.

In accordance with embodiments of the present disclosure, the cloud provider network 120 may enable service providers or enterprise to associate their endpoints with one or more global network addresses, which are addressable on the network 104 and/or the network 108 to interact with the data centers 110 in a load-balanced manner. For example, such service providers or enterprises may be able to configure the computing resources provided by the cloud provider network 120 to provide the network signal path obfuscation service described herein. The operations of such a network signal path obfuscation service are described in greater detail below with reference to FIGS. 3-7.

Additional details relating to global access points, load balancers, instances, and data centers are provided, for example, in U.S. application Ser. No. 16/219,770, filed Dec. 13, 2018, titled "LOAD BALANCED ACCESS TO DISTRIBUTED ENDPOINTS USING ANYCASTED GLOBAL NETWORK ADDRESSES AND NETWORK ADDRESS TRANSLATION," and U.S. application Ser. No. 14/627,834, filed Feb. 20, 2015, titled "LOAD BALANCER," the disclosures of which are incorporated herein by reference in their entirety.

Illustrative Interactions for Forwarding Network Packet

Figure 3:
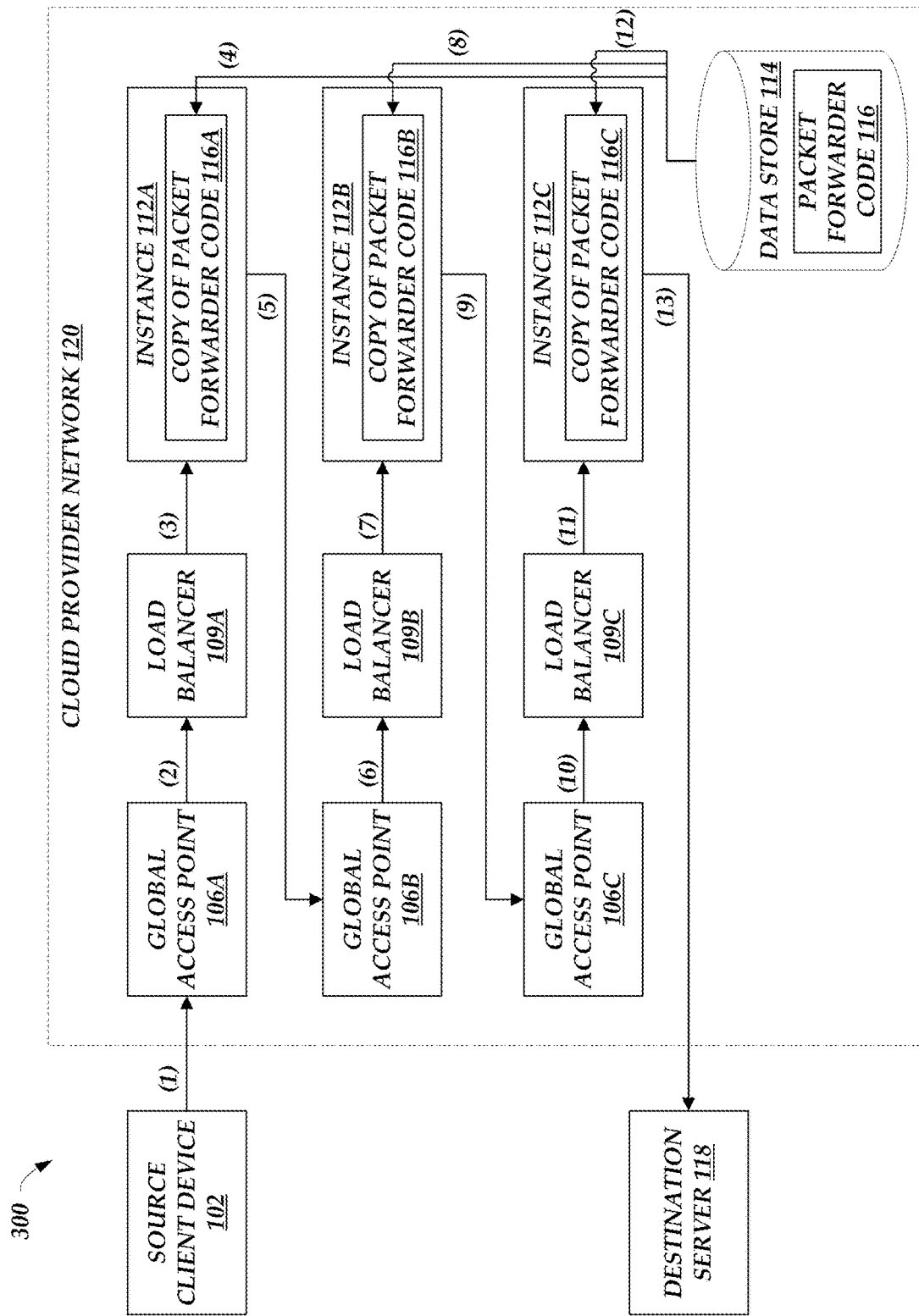
FIG. 3 depicts illustrative interactions for forwarding a network packet from a source client device to a destination server via a network signal path obfuscation service provided by a cloud provider network, in accordance with aspects of the present disclosure.

With reference to FIG. 3, illustrative interactions will be described for forwarding a network packet from a source client device 102 to a destination server 118 via an obfuscated network signal path, in accordance with aspects of the present disclosure. The interactions of FIG. 3 will be described with respect to three global access points (106A-C), three load balancers (109A-C), and three instances (112A-C). However, similar interactions may occur with any other number of access points, load balancers, and instances.

The interactions of FIG. 3 begin at (1), where the source client device 102 sends a network packet to the global access point 106A. For example, the network packet may be constructed, symmetrically encrypted, and wrapped using an IP-in-IP mechanism to open a connection to the network signal path obfuscation service provided by the cloud provider network 120.

At (2), the global access point 106A forwards the network packet to the load balancer 109A. For example, the global access point 106A may determine the existing load on each of a plurality of load balancers 109 that the global access point 106A has access to, and select the load balancer 109A based on the load balancer 109A having the least amount of load. As another example, the global access point 106A may randomly select from a set of load balancers 109 that have the same or similar level of load. In some embodiments, the load balancer 109A is a special load balancer deployed to only handle (or load balance) network packet forwarding requests from global access points 106. In other embodiments, the load balancer 109A is a multipurpose load balancer deployed to handle (or load balance) not only network packet forwarding requests from global access points 106 but also other types of requests.

The load balancer 109A receives the network packet and, at (3), redirects the packet to a copy of the packet forwarder code 116A executing on the instance 112A. In some embodiments, in response to receiving the network packet, the load balancer 109A causes the copy of the packet forwarder code 116A to be executed on the instance 112A acquired from an instance provisioning service (e.g., previously acquired or acquired in response to receiving the network packet) or to be executed via an on-demand code execution service, as described herein. In other embodiments, at the time the load balancer 109A receives the network packet, the previously acquired instance 112A may already be executing the copy of the packet forwarder code 116A, in the context of a previous packet, and the load balancer 109A may simply forward the received network packet to the packet forwarder code 116A. In some embodiments, the packet forwarder code 116A may not access the destination IP address included in the network packet. As indicated by (4), the packet forwarder code 116A may be downloaded from the data store 114.

In some embodiments, the load balancer 109A or the global access point 106A may authenticate the source client device 102, for example using mutual Transport Layer Security (mTLS) authentication. For example, the source client device 102 may be installed with a certificate that can be transparently used by the source client device 102 and the load balancer 109A to perform mutual authentication.

The packet forwarder code 116A receives the network packet and examines the wrapping packet header of the network packet and determines whether the hop count in the wrapping packet header is set to the maximum hop count (or another threshold value). If not, the packet forwarder code 116A increments the hop count by 1. In some embodiments, a shared secret is separately made accessible to the packet forwarder code 116A via a data store storing the shared secret, and the wrapping packet header includes a message authentication code generated using the shared secret, hop count, source IP address (e.g., IP address of the source client device 102), destination IP address (e.g., IP address of the destination server 118), the source port number, and/or the destination port number. If the packet forwarder code 116A determines that the wrapping packet header of the network packet is not suitably configured or does not include a message authentication code that matches the code generated by the packet forwarder code 116A, the packet forwarder code 116A drops the network packet.

Otherwise, the packet forwarder code 116A, at (5), forwards the network packet to the global access point 106B. In some cases, the identity of the global access point 106B may be hardcoded into the packet forwarder code 116A. In other cases, the packet forwarder code 116A may obtain the identity of the global access point 106B from another component within the cloud provider network 120 such as the data store 114. Alternatively, the packet forwarder code 116A may select from a list of global access points hardcoded into the code or obtained from another component within the cloud provider network 120 such as the data store 114.

At (6), the next-hop global access point 106B redirects the received network packet to the load balancer 109B. Through (7)-(11), the hop count of the network packet is incremented, and the network packet is forwarded until the configured maximum hop count is reached (or another exit condition is satisfied). After (11), in response to determining that the configured maximum hop count is reached, the copy of the packet forwarder code 116C behaves as an exit forwarder, which then strips the wrapping packet header, decrypts the unwrapped network packet using a key (e.g., hardcoded into the code or accessed elsewhere), identifies the source IP address and the destination IP address of the unwrapped network packet, replaces the source IP address in the header of the unwrapped network packet with its own IP address, and at (13), forwards the network packet to the destination server 118. Although the example shown in FIG. 3 repeats the sequence of global access point, load balancer, and instance until the network packet exits to the final destination, in other embodiments, the network packet may be forwarded via a different sequence of components, where, for example, a global access point forwards the network packet to another global access point without going through a load balancer or instance, or to an instance without going through a load balancer.

Figure 4:
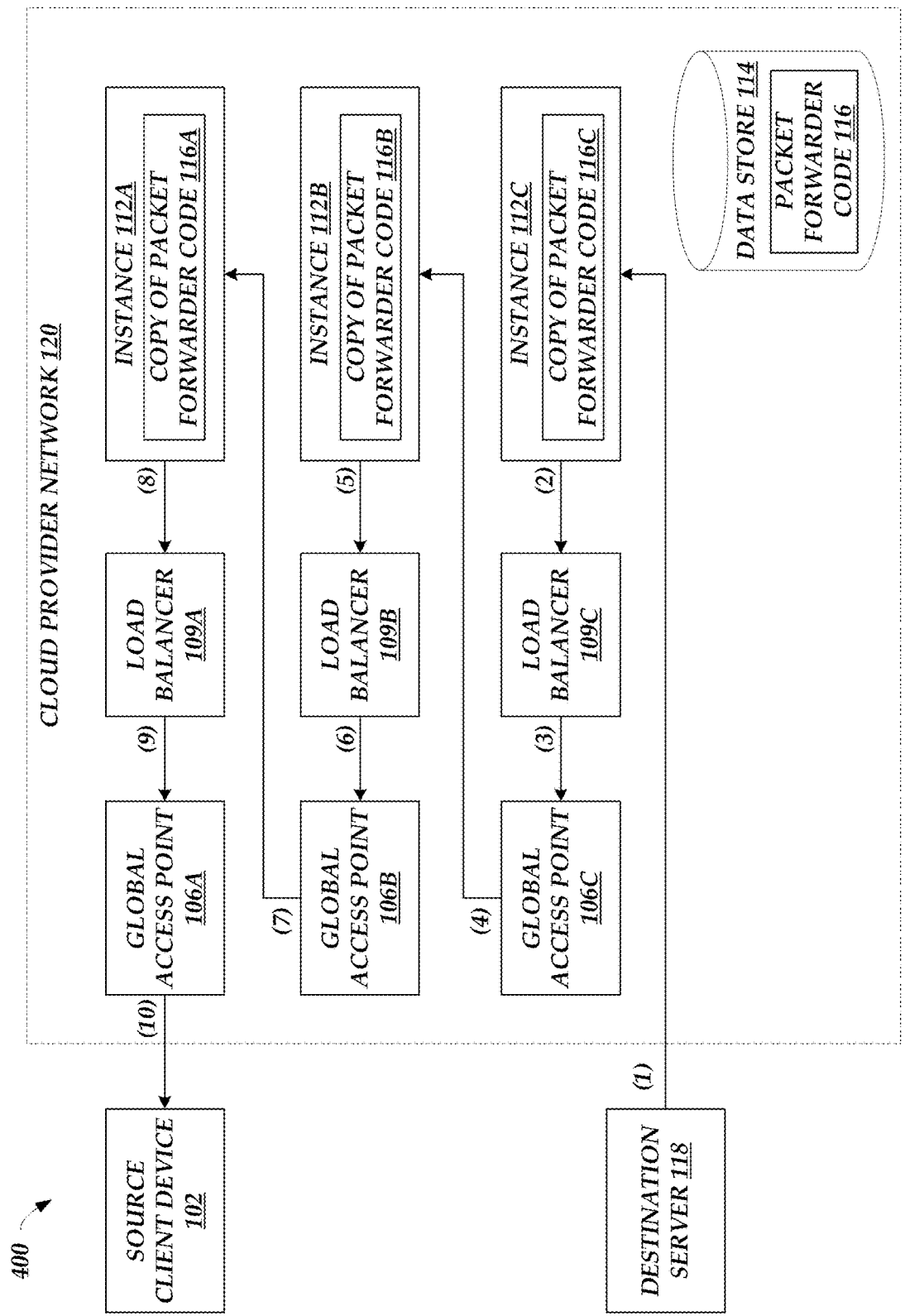
FIG. 4 depicts illustrative interactions for forwarding a response network packet from a destination server to a source client device via a network signal path obfuscation service provided by a cloud provider network, in accordance with aspects of the present disclosure.

Illustrative Interactions for Forwarding Response Network Packet Back to Source Client Device With reference to FIG. 4, illustrative interactions will be described for forwarding a response network packet from the destination server 118 to the source client device 102 via the obfuscated network signal path, in accordance with aspects of the present disclosure. The interactions of FIG. 4 will be described with respect to three global access points (106A-C), three load balancers (109A-C), and three instances (112A-C). However, similar interactions may occur with any other number of access points, load balancers, and instances.

The interactions of FIG. 4 begin at (1), where the destination server 118 sends a response network packet to the IP address of the packet forwarder code 116C, which served as the exit forwarder in FIG. 3. In response, the packet forwarder code 116C wraps the response network packet in a return header, which indicates the nature of the response network packet, and, at (2), sends the response network packet to the load balancer 109C, which was the load balancer that forwarded the initial network packet to the packet forwarder code 116C in FIG. 3. Because the connection that was created in FIG. 3 still remains open at the time the response network packet is received by the packet forwarder code 116C, the packet forwarder code 116C (and the other components in the obfuscated network signal path shown in FIG. 4) can access the connection state and routing data to identify the respective previous hops and forward the response network packet further along the obfuscated network signal path, all the way to the source client device 102. For example, at (3), the load balancer 109C may then forward the response network packet to the global access point 106C, which may then forward, at (4), the response network packet to the packet forwarder code 116B, and so on, until, at (9), the response network packet is forwarded to the global access point 106A, which, at (10), forwards the response network packet to the source client device 102. If the connection created in FIG. 3 has been terminated by the time the response network packet is sent by the destination server 118 (e.g., due to the packet forwarder code 116C exceeding its timeout period), the response network packet is dropped. For example, when the execution of the packet forwarder code 116C is terminated, any information the packet forwarder code 116C may have had regarding where a network packet came from and where the network packet was forwarded to may be lost or scrubbed.

Example Routine for Forwarding a Network Packet to the Destination

Figure 5:
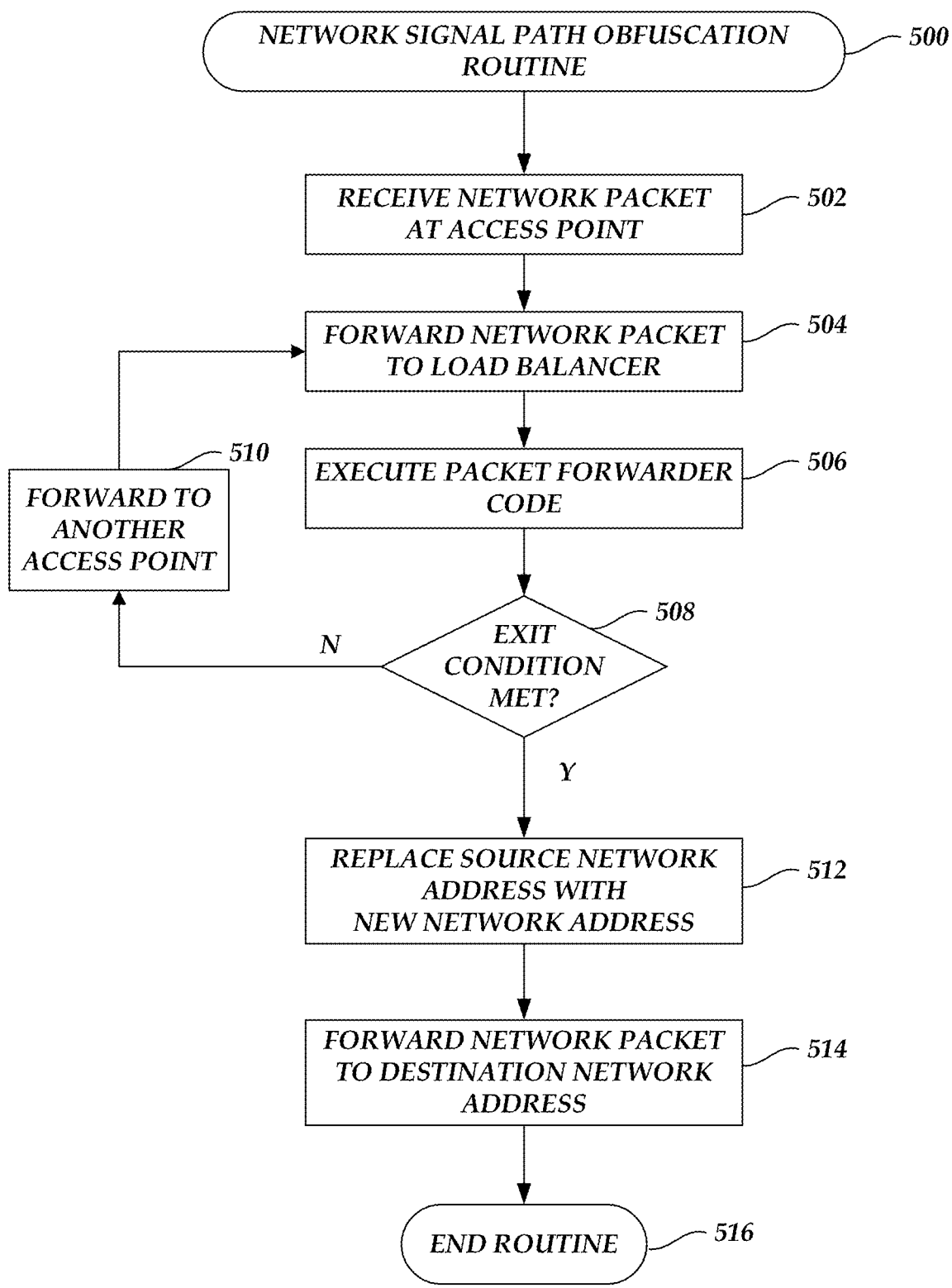
FIG. 5 depicts an illustrative routine for forwarding a network packet to a destination via an obfuscated network signal path, in accordance with aspects of the present disclosure.

FIG. 5 depicts an illustrative routine for forwarding a network packet to a destination via an obfuscated network signal path, in accordance with aspects of the present disclosure. The routine 500 may be carried out, for example, by the access points 106, the load balancers 109, and copies of the packet forwarder code 116 executing on the instances 112, as shown in FIG. 3. For convenience, the steps of the routine 600 are described as being performed by the network signal path obfuscation service. For example, the components of the network signal path obfuscation service may include one or more hardware computing devices and non-transitory physical computer storage storing instructions that, when executed by the one or more hardware computing devices, cause the one or more hardware computing devices to perform the steps of the routine 500.

The routine 500 begins at block 502, where the network signal path obfuscation service receives, at an access point 106, a network packet from a source client device 102. For example, the network packet may be constructed, symmetrically encrypted, and wrapped using an IP-in-IP mechanism to open a connection to the network signal path obfuscation service provided by the cloud provider network 120.

At block 504, the network signal path obfuscation service forwards the network packet to a load balancer 109. For example, the access point 106 may determine the existing load on each of a plurality of load balancers 109 that the access point 106 has access to, and select the load balancer 109 based on the load balancer 109 having the least amount of load. As another example, the access point 106 may randomly select from a set of load balancers 109 that have the same or similar level of load.

At block 506, the network signal path obfuscation service executes a copy of the packet forwarder code 116. For example, the network signal path obfuscation service may acquire an instance 112 from an instance provisioning service configured to provision virtual machine instances and execute the packet forwarder code on the instance 112. As another example, the network signal path obfuscation service may send a code execution request to an on-demand code execution service configured to execute program codes on a per-request basis.

At block 508, the network signal path obfuscation service determines whether an exit condition for allowing the network packet to exit the obfuscated network signal path is met. If the network signal path obfuscation service determines that the exit condition is not met, the routine 500 proceeds to block 510, where the network signal path obfuscation service forwards the network packet to another access point 106 and repeats blocks 504 and 506 with another load balancer 109 and another copy of the packet forwarder code 116, respectively. If the network signal path obfuscation service determines that the exit condition is met, the routine 500 proceeds to block 512.

At block 512, the network signal path obfuscation service replaces the source network address with a new network address that belongs to the exit node (e.g., a copy of the packet forwarder code 116 executing on an instance 112).

At block 514, the network signal path obfuscation service forwards the network packet to the destination network address. The routine 500 may then end at block 516.

The routine 500 can include fewer, more, or different blocks than those illustrated in FIG. 5 and/or one or more blocks illustrated in FIG. 5 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the client computing device 102 disclosed herein.

Example Routine for Forwarding a Network Packet to the Next Hop

Figure 6:
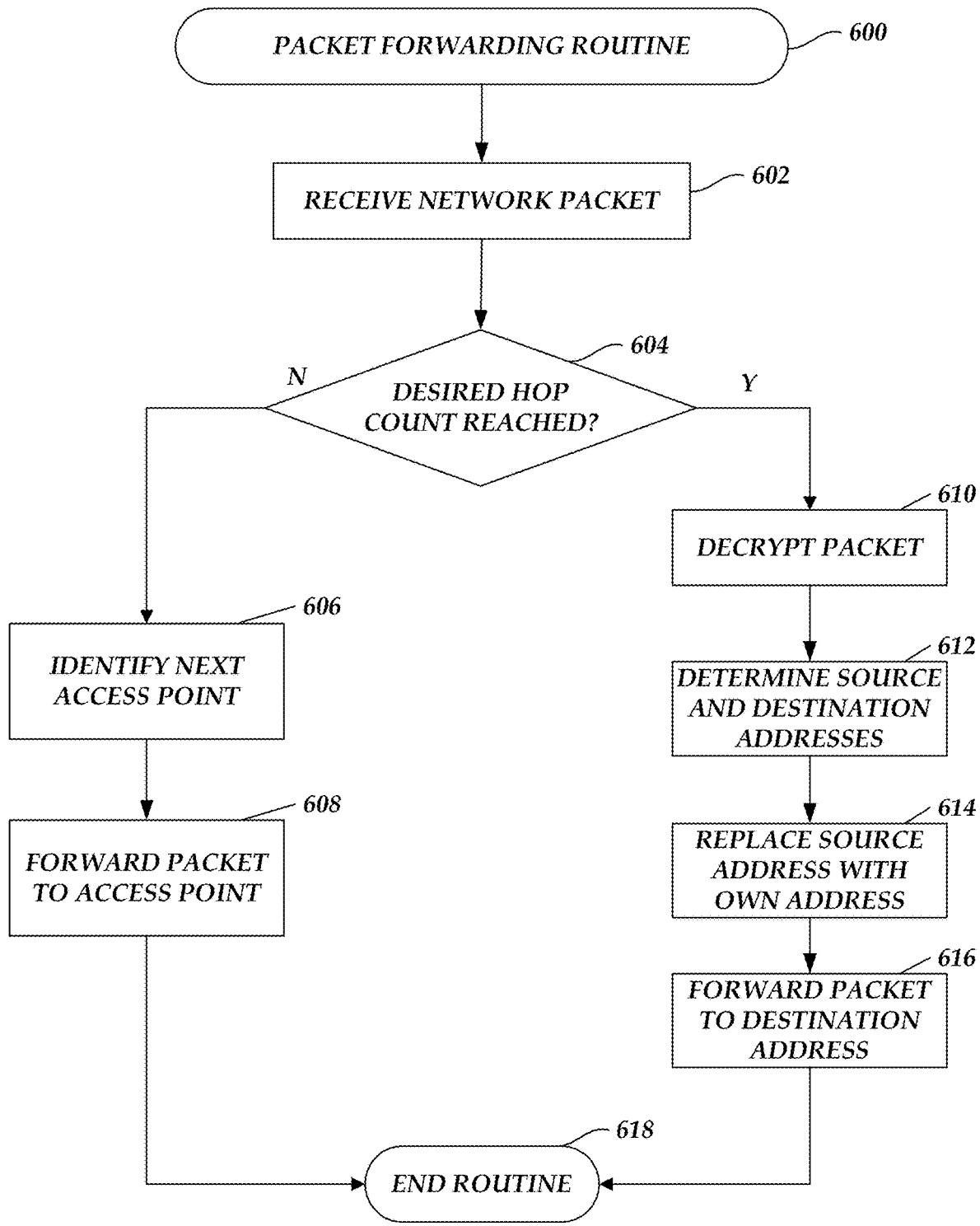
FIG. 6 depicts an illustrative routine for forwarding a network packet to the next hop, in accordance with aspects of the present disclosure.

FIG. 6 depicts an illustrative routine 600 for forwarding a network packet to the next hop, in accordance with aspects of the present disclosure. The routine 600 may be carried out, for example, by a copy of the packet forwarder code executing on an instance, as shown in FIG. 3, or one or more other components of the cloud provider network 120 described herein. For convenience, some or all of the steps of the routine 600 are described as being performed by the packet forwarder code 116C. For example, the instance 112C may include one or more hardware computing devices and non-transitory physical computer storage storing instructions that, when executed by the one or more hardware computing devices, cause the one or more hardware computing devices to perform the steps of the routine 600.

The routine 600 begins at block 602, where the packet forwarder code 116C receives a network packet.

At block 604, the packet forwarder code 116C determines whether a hop count associated with the network packet equals or has reached a desired hop count at which point the network packet can exit the obfuscated network signal path. If the packet forwarder code 116C determines that the hop count associated with the network packet does not equal or has not reached the desired hop count, the routine 600 proceeds to block 606, where the packet forwarder code 116C identifies the next access point 106 to which the network packet is to be forwarded, and forwards the network packet to the identified access point 106. If the packet forwarder code 116C determines that the hop count associated with the network packet equals or has reached the desired hop count, the routine 600 proceeds to block 610.

At block 610, the packet forwarder code 116C decrypts the network packet. For example, the packet forwarder code 116C may retrieve a key from a key management service that is usable to decrypt the network packet and use the key to decrypt the network packet.

At block 612, the packet forwarder code 116C determines the source address of the original sender of the network packet and the destination address to which the network packet is to be forwarded.

At block 614, the packet forwarder code 116C replaces the source address with the network address associated with the packet forwarder code 116C such than the recipient of the network packet would not be able to determine the identity of the source client device.

At block 616, the packet forwarder code 116C forwards the network packet to the destination address. For example, the destination address is associated with a client device or a server residing outside the cloud network provider 120. The routine 600 may then end at block 618.

The routine 600 can include fewer, more, or different blocks than those illustrated in FIG. 6 and/or one or more blocks illustrated in FIG. 6 may be modified, omitted, or switched without departing from the spirit and scope of the description. For example, although decryption is performed at block 610, in some embodiments, the network packet received by the packet forwarder 116C is not encrypted, and block 610 is omitted. As another example, in some embodiments, a response from the destination device is not needed or desired, and at block 614, the source address is not replaced with the network address of the packet forwarder code 116C (or replaced with some other address or randomly generated address). Moreover, it will be appreciated by those skilled in the art and others that some or all of the functions described in this disclosure may be embodied in software executed by one or more processors of the cloud provider network 120 and/or the client computing device 102 disclosed herein.

Example Routine for Forwarding a Response Network Packet to the Source

Figure 7:
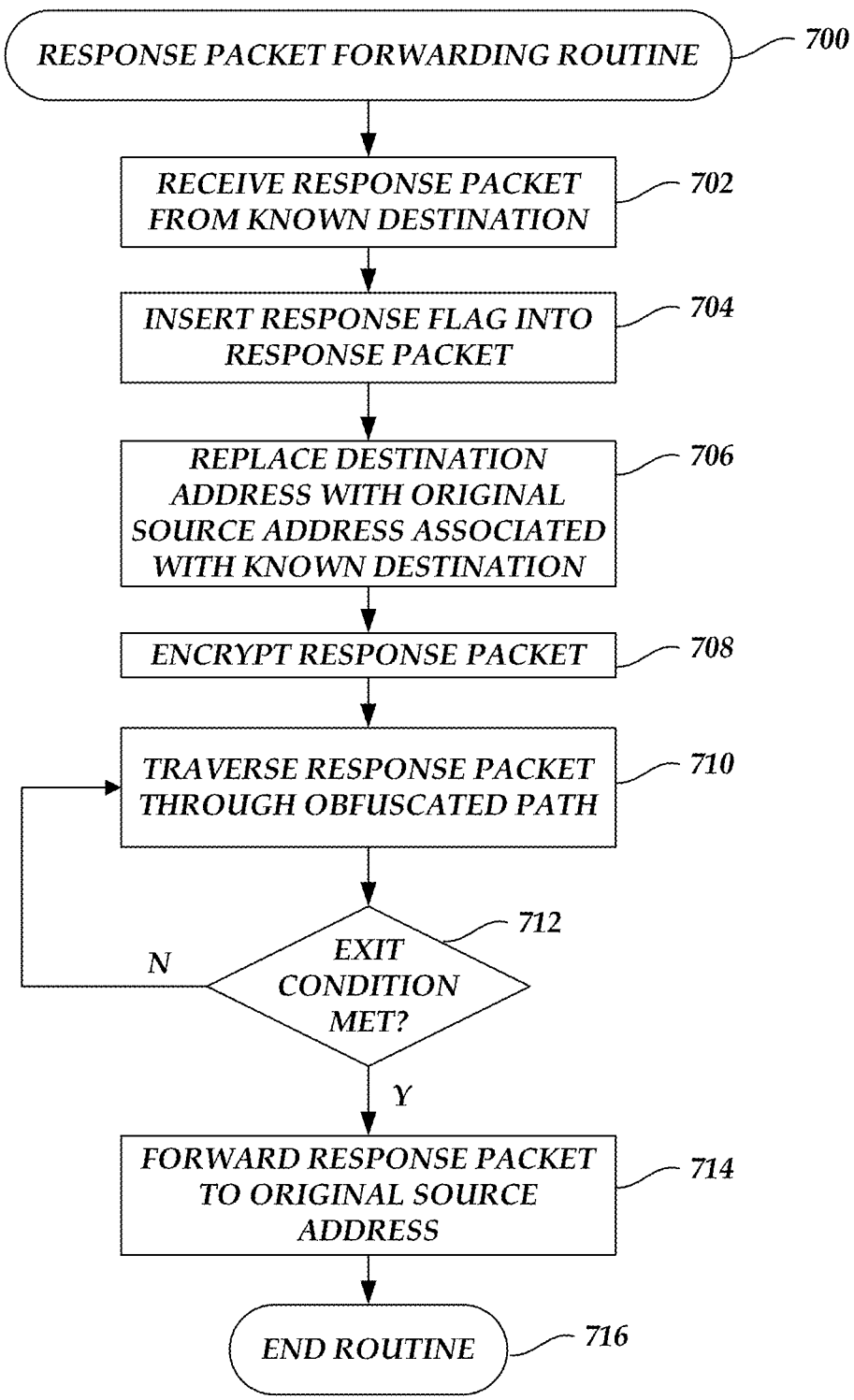
FIG. 7 depicts an illustrative routine for forwarding a response network packet back to a source via an obfuscated network signal path, in accordance with aspects of the present disclosure.

FIG. 7 depicts an illustrative routine for forwarding a response network packet back to a source via an obfuscated network signal path, in accordance with aspects of the present disclosure. The routine 700 may be carried out, for example, by the network signal path obfuscation service implemented by one or more components of the cloud provider network 120 described herein. For convenience, some or all of the steps of the routine 700 are described as being performed by the packet forwarder code 116C. For example, the instance 112C and one or more other components shown in FIG. 1 may include one or more hardware computing devices and non-transitory physical computer storage storing instructions that, when executed by the one or more hardware computing devices, cause the one or more hardware computing devices to perform the steps of the routine 700.

The routine 700 begins at block 702, where the packet forwarder code 116C receives a response network packet from a known destination device. For example, the destination device may be the destination server 118 of FIG. 3. The packet forwarder code 116C may determine, based on the metadata or data associated with the response network packet, that the response network packet is a response to a previous network packet forwarded to the destination device.

At block 704, the packet forwarder code 116C inserts a response flag into the response network packet such that other components in the obfuscated network signal path such as other packet forwarder codes 116, load balancers 109, and the access points 106 may determine that the response network packet is a response to an earlier network packet forwarded to the destination device.

At block 706, the packet forwarder code 116C replaces the destination address of the destination device in the response network packet with the network address of the original source client device so that the response network packet can be forwarded further along the obfuscated network signal path, eventually to the source client device.

At block 708, the network signal path obfuscation service (e.g., a component in the obfuscated network signal path such as the access point 106, load balancer 109, or packet forwarder code 116) encrypts the response network packet. For example, the component may retrieve a key from a key management service that is usable to encrypt the network packet and use the key to encrypt the network packet. As another example, the key may be hardcoded into the component.

At block 710, the packet forwarder code 116C and other components in the obfuscated network signal path (e.g., access points 106, load balancers 109, and other copies of the packet forwarder code 116) traverse the response network packet through the obfuscated network signal path.

At block 712, the network signal path obfuscation service (e.g., a component in the obfuscated network signal path such as the access point 106, load balancer 109, or packet forwarder code 116) determine whether an exit condition for allowing the response network packet to exit the obfuscated network signal path. For example, the component may determine that the exit condition is satisfied based on there being no more network addresses in the obfuscated network signal path to retrace. As another example, the component may determine whether a reverse hop count of the response network packet has reached a threshold count, and determine that the exit condition is satisfied based on the reverse hop count having reached the threshold count. If the component determines that the exit condition is not met, the routine 700 proceeds to block 710 to continue (e.g., after decrementing the reverse hop count as needed) to traverse the response network packet through the obfuscated network signal path. If the component determines that the exit condition is met, the routine 700 proceeds to block 714.

At block 714, the network signal path obfuscation service (e.g., another component in the obfuscated network signal path such as the access point 106 that originally received the initial network packet from the source) forwards the response network packet to the original source address. The routine 700 may then end at block 716.

The routine 700 can include fewer, more, or different blocks than those illustrated in FIG. 7 and/or one or more blocks illustrated in FIG. 7 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the client computing device 102 disclosed herein.

Example Architecture of Computing System

Figure 8:
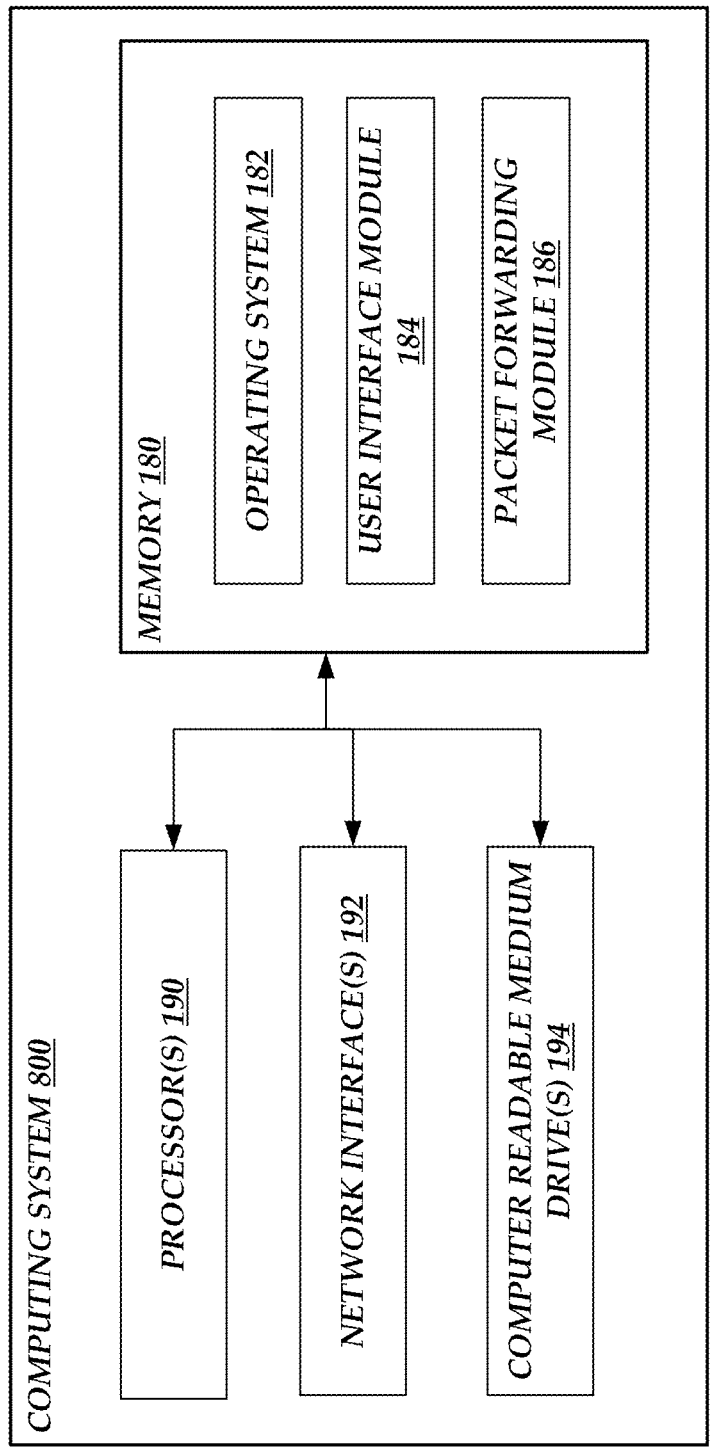
FIG. 8 depicts a general architecture of a computing device or system that can perform one or more of the network signal path obfuscation techniques, in accordance with aspects of the present disclosure.

FIG. 8 depicts an example architecture of a computing system (referred to as computing system 800) that can be used to perform one or more of the techniques described herein or illustrated in FIGS. 1-7 (e.g., global access point, load balancer, instance, source client device, destination server, etc.). The general architecture of the computing system 800 depicted in FIG. 8 includes an arrangement of computer hardware and software modules that may be used to implement one or more aspects of the present disclosure. The computing system 800 may include many more (or fewer) elements than those shown in FIG. 8. It is not necessary, however, that all of these elements be shown in order to provide an enabling disclosure. As illustrated, the computing system 800 includes processor(s) 190, network interface(s) 192, and computer readable medium drive(s) 194, all of which may communicate with one another by way of a communication bus. The network interface(s) 192 may provide connectivity to one or more networks or computing systems. The processor(s) 190 may thus receive information and instructions from other computing systems or services via the network 104 illustrated in FIG. 1.

The processor(s) 190 may also communicate with memory 180. The memory 180 may contain computer program instructions (grouped as modules in some embodiments) that the processor(s) 190 executes in order to implement one or more aspects of the present disclosure. The memory 180 may include RAM, ROM, and/or other persistent, auxiliary, or non-transitory computer-readable media. The memory 180 may store an operating system 182 that provides computer program instructions for use by the processor(s) 190 in the general administration and operation of the computing system 800. The memory 180 may further include computer program instructions and other information for implementing one or more aspects of the present disclosure. For example, in one embodiment, the memory 180 includes a user interface module 184 that generates user interfaces (and/or instructions therefor) for display upon a client device (e.g., the source user device 102 of FIG. 1), e.g., via a navigation and/or browsing interface such as a browser or application installed on the client device. In addition, the memory 180 may include or communicate with one or more data stores. In addition to and/or in combination with the user interface module 184, the memory 180 may include one or more additional modules such as a packet forwarding module 186 that implement one or more of the techniques described in the present disclosure.

Enumerated Implementations (EIs)

Some examples of enumerated implementations (EIs) are provided in this section, without limitation.

EI 1: A system comprising: a plurality of access points configured to provide access to a network signal path obfuscation service; and a plurality of network load balancers configured to launch a program code configured to route network traffic to one of the plurality of access points, wherein a first access point of the plurality of access points is configured to at least: receive, from a client device, a network packet having a first header indicating that the network packet is addressed to a first network address associated with the first access point, wherein the network packet includes at least (i) a source network address from which the network packet originates, and (ii) a destination network address to which the network packet is to be forwarded via an obfuscated network signal path provided by the network signal path obfuscation service; select a first network load balancer from the plurality of network load balancers; and forward the network packet to the first network load balancer, wherein the first network load balancer is configured to at least: receive the network packet from the first access point; acquire first compute capacity usable to execute a first copy of a packet forwarder code for forwarding the network packet; and cause the first copy of the packet forwarder code to be executed using the first compute capacity, wherein the first copy of the packet forwarder code is configured to at least: determine that the network packet is associated with a first hop count that does not satisfy an exit condition for allowing the network packet to exit the obfuscated network signal path and to be forwarded to the destination network address; increment the first hop count associated with the network packet; and forward the network packet to another access point of the plurality of access points, wherein a second access point of the plurality of access points is configured to at least: receive the network packet having a second header indicating that the network packet is addressed to a second network address associated with the second access point; select a second network load balancer from the plurality of network load balancers; and forward the network packet to the second network load balancer, wherein the second network load balancer is configured to at least: receive the network packet from the second access point; acquire second compute capacity usable to execute a second copy of the packet forwarder code for forwarding the network packet; and cause the second copy of the packet forwarder code to be executed using the second compute capacity, wherein the second copy of the packet forwarder code is configured to at least: determine that the network packet is associated with a second hop count that satisfies the exit condition for allowing the network packet to exit the obfuscated network signal path and to be forwarded to the destination network address; replace the source network address with a new network address associated with the second copy of the packet forwarder code and retrieve the destination network address included in the network packet; and forward the network packet to the destination network address.

EI 2: The system of claim 1, wherein the first compute capacity and the second compute capacity are two separate instances acquired from an instance provisioning service configured to provision instances.

EI 3: The system of claim 1, wherein the first compute capacity and the second compute capacity are stateless compute capacity acquired from an on-demand code execution service configured to execute program codes on a per-request basis.

EI 4: The system of claim 1, wherein the first copy of the packet forwarder code is not configured to access the destination network address of the network packet.

EI 5: A computer implemented method comprising: receiving, at a first access point, a network packet for transmission via an obfuscated network signal path, wherein the network packet includes a source network address associated with a sender of the network packet and a destination network address to which the network packet is to be forwarded, in response to receiving the network packet, transmitting, to a serverless code execution system configured to acquire compute capacity and execute program codes on a per-request basis, a first code execution request to execute a packet forwarder code; determining, by a first copy of the packet forwarder code downloaded onto a first computing resource by the serverless code execution system in response to the first code execution request and executing on the first computing resource, that the network packet does not satisfy a condition for exiting the obfuscated network signal path; forwarding, by the first copy of the packet forwarder code, the network packet to a second access point having a first network address that is different from the destination network address of the network packet; in response to receiving the network packet, transmitting, to the serverless code execution system, a second code execution request to execute the packet forwarder code; determining, by a second copy of the packet forwarder code downloaded onto a second computing resource by the serverless code execution system in response to the second code execution request and executing on the second computing resource, that the network packet satisfies the condition for exiting the obfuscated network signal path; determining, by the second copy of the packet forwarder code, the source network address and the destination network address of the network packet; replacing the source network address in the network packet with a second network address associated with the second copy of the packet forwarder code; and forwarding, by the second copy of the packet forwarder code, the network packet to the destination network address.

EI 6: The method of claim 5, further comprising: receiving a response network packet from the destination network address; determining a third network address associated with a third access point in the obfuscated network signal path, and forwarding the response network packet to the third network address; determining a fourth network address associated with the first copy of the packet forwarder code in the obfuscated network signal path, and forwarding the response network packet to the fourth network address; determining a fifth network address associated with the first access point, and forwarding the response network packet to the fifth network address; and forwarding the response packet to the source network address.

EI 7: The method of claim 5, wherein the first copy of the packet forwarder code is executed on the first compute capacity that is associated with a first user account having a first set of user credentials, and the second copy of the packet forwarder code is executed on the second compute capacity that is associated with a second user account having a second set of user credentials different from the first set of user credentials.

EI 8: The method of claim 5, wherein the first copy of the packet forwarder code is executed on the first compute capacity located in a first region associated with a first regional endpoint address, and the second copy of the packet forwarder code is executed on the second compute capacity located in a second region associated with a second regional endpoint address that is different from the first regional endpoint address.

EI 9: The method of claim 5, wherein the first compute capacity and the second compute capacity are two separate instances acquired from an instance provisioning service configured to provision instances.

EI 10: The method of claim 5, wherein the first compute capacity and the second compute capacity are stateless compute capacity acquired from an on-demand code execution service configured to execute program codes on a per-request basis.

EI 11: The method of claim 5, further comprising: generating a first message authentication code based at least in part on a hop count associated with the network packet, the source network address, and the destination network address; comparing the first message authentication code to a second message authentication code included in a header of the network packet; and forwarding the network packet to the second access point based on the first message authentication code matching the second message authentication code.

EI 12: The method of claim 5, further comprising wrapping a response network packet received from the destination network address with a return header, wherein the return header includes a flag indicating that the response network packet is to be returned via the obfuscated network signal path.

EI 13: Non-transitory computer-readable media storing computer-executable instructions that, when executed by one or more computing devices, configure the one or more computing devices to at least: download a packet forwarder code in response to a request to execute the packet forwarder code; cause the packet forwarder code to be executed on a computing resource acquired in response to the request to execute the packet forwarder code; receive, at a first network address associated with the packet forwarder code, a network packet for transmission via an obfuscated network signal path, wherein the network packet includes a source network address and a destination network address; determine that the network packet satisfies a condition for exiting the obfuscated network signal path; determine the source network address and the destination network address of the network packet; replace the source network address in the network packet with the first network address, wherein the first network address is different from the source network address; and forward the network packet to the destination network address.

EI 14: The non-transitory computer-readable media of claim 13, wherein the instructions further configure the one or more computing devices to: receive a response network packet from the destination network address; determine a second network address associated with an access point in the obfuscated network signal path that is configured to forward the response network packet further down the obfuscated network signal path; and forward the response network packet to the second network address.

EI 15: The non-transitory computer-readable media of claim 14, wherein the packet forwarder code having the first network address is associated with a first user account having a first set of user credentials, and the access point having the second network address is associated with a second user account having a second set of user credentials different from the first set of user credentials.

EI 16: The non-transitory computer-readable media of claim 14, wherein the packet forwarder code having the first network address resides in a first region associated with a first regional endpoint address, and the access point having the second network address resides in a second region associated with a second regional endpoint address that is different from the first regional endpoint address.

EI 17: The non-transitory computer-readable media of claim 13, wherein the one or more computing devices comprise a virtual machine instance acquired from an instance provisioning service configured to provision virtual machine instances.

EI 18: The non-transitory computer-readable media of claim 13, wherein the one or more computing devices comprise a virtual machine instance configured to execute program codes on a per-request basis.

EI 19: The non-transitory computer-readable media of claim 13, wherein the instructions further configure the one or more computing devices to: generate a first message authentication code based at least in part on a hop count associated with the network packet, the source network address, and the destination network address; compare the first message authentication code to a second message authentication code included in a header of the network packet; and forward the network packet to the destination network address based on the first message authentication code matching the second message authentication code.

EI 20: The non-transitory computer-readable media of claim 13, wherein the instructions further configure the one or more computing devices to wrap a response network packet received from the destination network address with a return header, wherein the return header includes a flag indicating that the response network packet is to be returned via the obfuscated network signal path.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
a plurality of access points configured to provide access to a network signal path obfuscation service; and
a plurality of network load balancers configured to launch a program code configured to route network traffic to one of the plurality of access points,
wherein a first access point of the plurality of access points is configured to at least:
receive, from a client device, a network packet having a first header indicating that the network packet is addressed to a first network address associated with the first access point, wherein the network packet includes at least (i) a source network address from which the network packet originates, and (ii) a destination network address to which the network packet is to be forwarded via an obfuscated network signal path provided by the network signal path obfuscation service;
select a first network load balancer from the plurality of network load balancers; and
forward the network packet to the first network load balancer,
wherein the first network load balancer is configured to at least:
receive the network packet from the first access point;
acquire first compute capacity usable to execute a first copy of a packet forwarder code for forwarding the network packet; and
cause the first copy of the packet forwarder code to be executed using the first compute capacity,
wherein the first copy of the packet forwarder code is configured to at least:
determine that the network packet is associated with a first hop count that does not satisfy an exit condition for allowing the network packet to exit the obfuscated network signal path and to be forwarded to the destination network address;
increment the first hop count associated with the network packet; and
forward the network packet to another access point of the plurality of access points,
wherein a second access point of the plurality of access points is configured to at least:
receive the network packet having a second header indicating that the network packet is addressed to a second network address associated with the second access point;
select a second network load balancer from the plurality of network load balancers; and
forward the network packet to the second network load balancer,
wherein the second network load balancer is configured to at least:
receive the network packet from the second access point;
acquire second compute capacity usable to execute a second copy of the packet forwarder code for forwarding the network packet; and
cause the second copy of the packet forwarder code to be executed using the second compute capacity,
wherein the second copy of the packet forwarder code is configured to at least:
determine that the network packet is associated with a second hop count that satisfies the exit condition for allowing the network packet to exit the obfuscated network signal path and to be forwarded to the destination network address;
replace the source network address with a new network address associated with the second copy of the packet forwarder code and retrieve the destination network address included in the network packet; and
forward the network packet to the destination network address.

2. The system of claim 1, wherein the first compute capacity and the second compute capacity are two separate instances acquired from an instance provisioning service configured to provision instances.

3. The system of claim 1, wherein the first compute capacity and the second compute capacity are stateless compute capacity acquired from an on-demand code execution service configured to execute program codes on a per-request basis.

4. The system of claim 1, wherein the first copy of the packet forwarder code is not configured to access the destination network address of the network packet.

5. A computer-implemented method comprising:
receiving, at a first access point, a network packet for transmission via an obfuscated network signal path, wherein the network packet includes a source network address associated with a sender of the network packet and a destination network address to which the network packet is to be forwarded,
in response to receiving the network packet, transmitting, to a serverless code execution system configured to acquire compute capacity and execute program codes on a per-request basis, a first code execution request to execute a packet forwarder code;
determining, by a first copy of the packet forwarder code downloaded onto a first computing resource by the serverless code execution system in response to the first code execution request and executing on the first computing resource, that the network packet does not satisfy a condition for exiting the obfuscated network signal path;
forwarding, by the first copy of the packet forwarder code, the network packet to a second access point having a first network address that is different from the destination network address of the network packet;
in response to receiving the network packet, transmitting, to the serverless code execution system, a second code execution request to execute the packet forwarder code;
determining, by a second copy of the packet forwarder code downloaded onto a second computing resource by the serverless code execution system in response to the second code execution request and executing on the second computing resource, that the network packet satisfies the condition for exiting the obfuscated network signal path;
determining, by the second copy of the packet forwarder code, the source network address and the destination network address of the network packet;
replacing the source network address in the network packet with a second network address associated with the second copy of the packet forwarder code; and
forwarding, by the second copy of the packet forwarder code, the network packet to the destination network address.

6. The method of claim 5, further comprising:
receiving a response network packet from the destination network address;

determining a third network address associated with a third access point in the obfuscated network signal path, and forwarding the response network packet to the third network address;

determining a fourth network address associated with the first copy of the packet forwarder code in the obfuscated network signal path, and forwarding the response network packet to the fourth network address;

determining a fifth network address associated with the first access point, and forwarding the response network packet to the fifth network address; and forwarding the response packet to the source network address.

7. The method of claim 5, wherein the first copy of the packet forwarder code is executed on the first compute capacity that is associated with a first user account having a first set of user credentials, and the second copy of the packet forwarder code is executed on the second compute capacity that is associated with a second user account having a second set of user credentials different from the first set of user credentials.

8. The method of claim 5, wherein the first copy of the packet forwarder code is executed on the first compute capacity located in a first region associated with a first regional endpoint address, and the second copy of the packet forwarder code is executed on the second compute capacity located in a second region associated with a second regional endpoint address that is different from the first regional endpoint address.

9. The method of claim 5, wherein the first compute capacity and the second compute capacity are two separate instances acquired from an instance provisioning service configured to provision instances.

10. The method of claim 5, wherein the first compute capacity and the second compute capacity are stateless compute capacity acquired from an on-demand code execution service configured to execute program codes on a per-request basis.

11. The method of claim 5, further comprising:
generating a first message authentication code based at least in part on a hop count associated with the network packet, the source network address, and the destination network address;
comparing the first message authentication code to a second message authentication code included in a header of the network packet; and
forwarding the network packet to the second access point based on the first message authentication code matching the second message authentication code.

12. The method of claim 5, further comprising wrapping a response network packet received from the destination network address with a return header, wherein the return header includes a flag indicating that the response network packet is to be returned via the obfuscated network signal path.

13. Non-transitory computer-readable media storing computer-executable instructions that, when executed by one or more computing devices, configure the one or more computing devices to at least:
download a packet forwarder code in response to a request to execute the packet forwarder code;
cause the packet forwarder code to be executed on a computing resource acquired in response to the request to execute the packet forwarder code;
receive, at a first network address associated with the packet forwarder code, a network packet for transmission via an obfuscated network signal path, wherein the network packet includes a source network address and a destination network address;
determine that the network packet satisfies a condition for exiting the obfuscated network signal path;
determine the source network address and the destination network address of the network packet;
replace the source network address in the network packet with the first network address, wherein the first network address is different from the source network address; and
forward the network packet to the destination network address.

14. The non-transitory computer-readable media of claim 13, wherein the instructions further configure the one or more computing devices to:
receive a response network packet from the destination network address;
determine a second network address associated with an access point in the obfuscated network signal path that is configured to forward the response network packet further down the obfuscated network signal path; and
forward the response network packet to the second network address.

15. The non-transitory computer-readable media of claim 14, wherein the packet forwarder code having the first network address is associated with a first user account having a first set of user credentials, and the access point having the second network address is associated with a second user account having a second set of user credentials different from the first set of user credentials.

16. The non-transitory computer-readable media of claim 14, wherein the packet forwarder code having the first network address resides in a first region associated with a first regional endpoint address, and the access point having the second network address resides in a second region associated with a second regional endpoint address that is different from the first regional endpoint address.

17. The non-transitory computer-readable media of claim 13, wherein the one or more computing devices comprise a virtual machine instance acquired from an instance provisioning service configured to provision virtual machine instances.

18. The non-transitory computer-readable media of claim 13, wherein the one or more computing devices comprise a virtual machine instance configured to execute program codes on a per-request basis.

19. The non-transitory computer-readable media of claim 13, wherein the instructions further configure the one or more computing devices to:
generate a first message authentication code based at least in part on a hop count associated with the network packet, the source network address, and the destination network address;
compare the first message authentication code to a second message authentication code included in a header of the network packet; and
forward the network packet to the destination network address based on the first message authentication code matching the second message authentication code.

20. The non-transitory computer-readable media of claim 13, wherein the instructions further configure the one or more computing devices to wrap a response network packet received from the destination network address with a return header, wherein the return header includes a flag indicating that the response network packet is to be returned via the obfuscated network signal path.

* * * * *